UNITED STATES PATENT OFFICE.

THOMAS J. COVELL, OF BERGEN, NEW JERSEY.

IMPROVEMENT IN MAKING VEGETABLE EXTRACTS.

Specification forming part of Letters Patent No. 123,679, dated February 13, 1872.

*To all whom it may concern:*

Be it known that I, THOMAS J. COVELL, of (Bergen) Hudson county, in the State of New Jersey, have invented a new and useful Improvement in the Art of Producing Vegetable Extracts; and I do hereby declare that the following is a full and exact description thereof.

In the production of vegetable extracts by percolation, prior to the perfection of this invention of mine, it has been the universal practice to leave the vegetable matter in the percolator at the end of each percolating operation, saturated with the alcoholic menstruum employed in said operation, thereby causing the loss of about one gallon of the alcoholic menstruum with each charge of a percolator of the usual size.

I am aware that said menstruum can be recovered by distillation, and I am also aware that the expense of said recovery will nearly or quite equal the value of the menstruum recovered.

In my improved process of producing vegetable extracts by percolation, the properly prepared vegetable matter is placed in any desired form of percolator, and after the requisite quantity of alcoholic menstruum has entirely passed into the same, I pour into the percolator a sufficient quantity of an aqueous or other inexpensive fluid to follow the menstruum and force the same entirely through the vegetable matter in the percolator. The water or other aqueous fluid employed by me in said process may be incorporated with any antiseptic substance that will prevent the fermentation of the vegetable matter in the percolator during the passage of said fluid through the same.

I claim as my invention—

The within-described improvement in the art of producing vegetable extracts; said improvement consisting in the use of an aqueous or other inexpensive fluid in said art, substantially as and for the purpose herein set forth.

THOMAS J. COVELL.

Witnesses:
HERBERT TORREY,
E. W. FORCE.